United States Patent [19]

Murray

[11] Patent Number: 5,014,044

[45] Date of Patent: May 7, 1991

[54] MAGNIFICATION ASSEMBLY FOR DIGITIZER CURSOR

[75] Inventor: Wayne J. Murray, Bridgeport, Conn.

[73] Assignee: Summagraphics Corporation, Seymour, Conn.

[21] Appl. No.: 199,674

[22] Filed: May 27, 1988

[51] Int. Cl.[5] .............................................. G09G 5/08
[52] U.S. Cl. .................................... 340/710; 178/18; 33/1 M
[58] Field of Search ................ 340/709, 710; 364/900; 33/1 M, 18.1; 350/114, 115, 116; 178/18, 19

[56] References Cited

U.S. PATENT DOCUMENTS 1,424,848  8/1922  Paddison .
1,806,422  5/1931  Shaen ................................. 350/116
4,639,547  1/1987  Jacob-Grinschgl et al. .......... 178/18

FOREIGN PATENT DOCUMENTS 17185  6/1898  Switzerland .

OTHER PUBLICATIONS

Advertisement of Summagraphics Corporation for the Intelligent Digitizer (Form 380 10K) Series, (Form No. 181, Rev. D. 3/88).
Advertisement of Summagraphics Corporation for Microgrid II Series, (Form No. 181, Rev. D. 3/88).
J. Titus; "Digitizing tablets offer choices of formats, operating modes, and pointers", Apr. 1986, pp. 69–72, 74, E. D. N. Electrical Design News, vol. 31, No. 8.
T. A. Nobbe; "Graphic-input devices for CAD/CAM", Feb. 1985, pp. 106–110, Machine Design, vol. 57, No. 4.

Primary Examiner—Jeffery A. Brier
Attorney, Agent, or Firm—Rosen, Dainow & Jacobs

[57] ABSTRACT

An assembly utilizable with a digitizer cursor for increasing the accuracy of position determinations, wherein the cursor has cross-hairs for enabling the positioning of the cursor at a desired point on a digitizing surface, comprises in combination a magnifying lens and a connector for mounting the magnifying lens to the cursor in a region near the cross-hairs of the cursor. The connector includes a cradle or holder attachable to the cursor and a mounting arm connected to the lens, the cradle and the mounting arm being releasably connectable to one another. The mounting cradle is attachable exemplarily by adhesive to an outer housing surface of the cursor in a region near the cross-hairs. The mounting arm is integral with the lens, the lens having a polished surface and the mounting arm having relatively rough, unpolished, surfaces. Coacting locking elements are provided on the cradle and the mounting arm for releasably locking the lens in a predetermined position with respect to the cursor.

23 Claims, 3 Drawing Sheets

MAGNIFICATION ASSEMBLY FOR DIGITIZER CURSOR

BACKGROUND OF THE INVENTION

This invention relates to an assembly utilizable with a digitizer cursor for increasing the accuracy of position determinations.

Digitizers generally include a manually movable cursor and a digitizing surface or tablet. A piece of paper or other web bearing a two-dimensional graphic illustration or design to be converted into digital coordinates for use by a computer is laid on the digitizing surface. The cursor is then placed on the piece of paper and manually moved from position to position to trace the printed illustration or design. At each desired position of the cursor, the operator pushes a button exemplarily on the cursor to induce the storage of position coordinates in a computer memory operatively connected to the cursor. To facilitate the alignment of the cursor with a feature of the illustration or design, the cursor is provided with cross-hairs which the operator aligns with the desired feature.

The position coordinates of a point on the digitizing surface are sensed through inductive or capacitive elements in the digitizing tablet and the cursor. Since the introduction of digitizers almost two decades ago, gradual improvements have increased the accuracy of the position sensing to a point now where accuracy limitations arise more from human error than from the crudeness of the digitizer design.

OBJECTS OF THE INVENTION

An object of the present invention is to provide an assembly for use with a digitizer cursor for increasing the accuracy of position determinations.

Another object of the present invention is to provide such an assembly which is easily mounted to a digitizer cursor and can be used on existing cursors.

Another, more particular, object of the present invention is to provide such an assembly which is easily neutralized or at least partially removed to facilitate the making of coarse position determinations.

A further particular object of the present invention is to provide such an assembly which includes a magnification lens.

Yet another particular object of the present invention is to provide such an assembly with a magnification lens which is replaceable by lenses of different powers of magnification.

SUMMARY OF THE INVENTION

The present invention is directed to an assembly utilizable with a digitizer cursor for increasing the accuracy of position determinations, and to a cursor incorporating such an assembly, the cursor having cross-hairs for enabling the positioning of the cursor at a desired point on a digitizing surface. An assembly in accordance with the present invention comprises in combination a magnifying lens and mounting means for mounting the magnifying lens to the cursor in a region near the cross-hairs of the cursor. The mounting means includes first means attachable to the cursor and second means connected to the lens.

Pursuant to another feature of the present invention, the first means includes a first member attachable to the cursor and the second means includes a second member connected to the lens the first member and the second member being releasably connectable to one another. Cooperating structure on the first and second members removably connects the second member to the first member. The cooperating structure comprises a projection on one of the members and a recess or receptacle in the other of the members for removably receiving the projection. More preferably, the second member includes a mounting arm connected to and extending from the lens, while the first member includes a mounting cradle attachable exemplarily by adhesive to an outer housing surface of the cursor in a region near the cross-hairs.

In a particular embodiment of the present invention, the mounting arm is integral with the lens.

Pursuant to another feature of the present invention, the first and second members are pivotably connected and coacting locking elements are provided on the first and second members for releasably locking the lens in predetermined or operative pivoted position with respect to the cursor. Preferably, the lens is aligned in the predetermined position with the cross-hairs or the cursor. The locking elements advantageously include a projection on one of the members and a recess on the other member. The locking projection may take the form of a longitudinally extending rib on the mounting arm.

Pursuant to a particular embodiment of the present invention, the lens defines a plane and the mounting arm extends perpendicularly with respect to that plane. In addition, the mounting arm is provided with a plurality of circumferentially spaced longitudinally extending ribs preferably extending only partially the length of the mounting arm, while the cradle is provided with a cylindrical recess for receiving the mounting arm, the cylindrical recess being provided with a shoulder engageable by end surfaces of the ribs in a mounted configuration of the assembly. In accordance with another feature of this embodiment, a plurality of the ribs have cylindrical outer surfaces engageable with a cylindrical surface of the recess in the cradle.

A magnifying assembly in accordance with the present invention is easily mounted to a digitizer cursor and can be used on existing cursors. In addition, the magnifying lens component of the assembly is easily neutralized, i.e., easily swung completely out of the viewing path, for example, to facilitate the making of coarse position determinations. The magnifying lens of an assembly in accordance with the present invention is easily replaceable by lenses of different powers of magnification, should the circumstances of use warrant a different magnification power.

DETAILED DESCRIPTION

Figure 1:
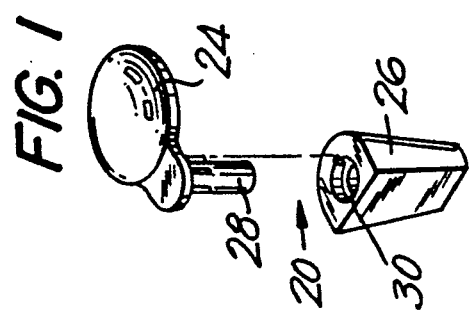
FIG. 1 is a partially schematic perspective view of a magnifying assembly in accordance with the present invention for increasing the accuracy of position determinations by digitizers, showing in exploded view a magnifying lens insertable into a cradle.
Figure 4:
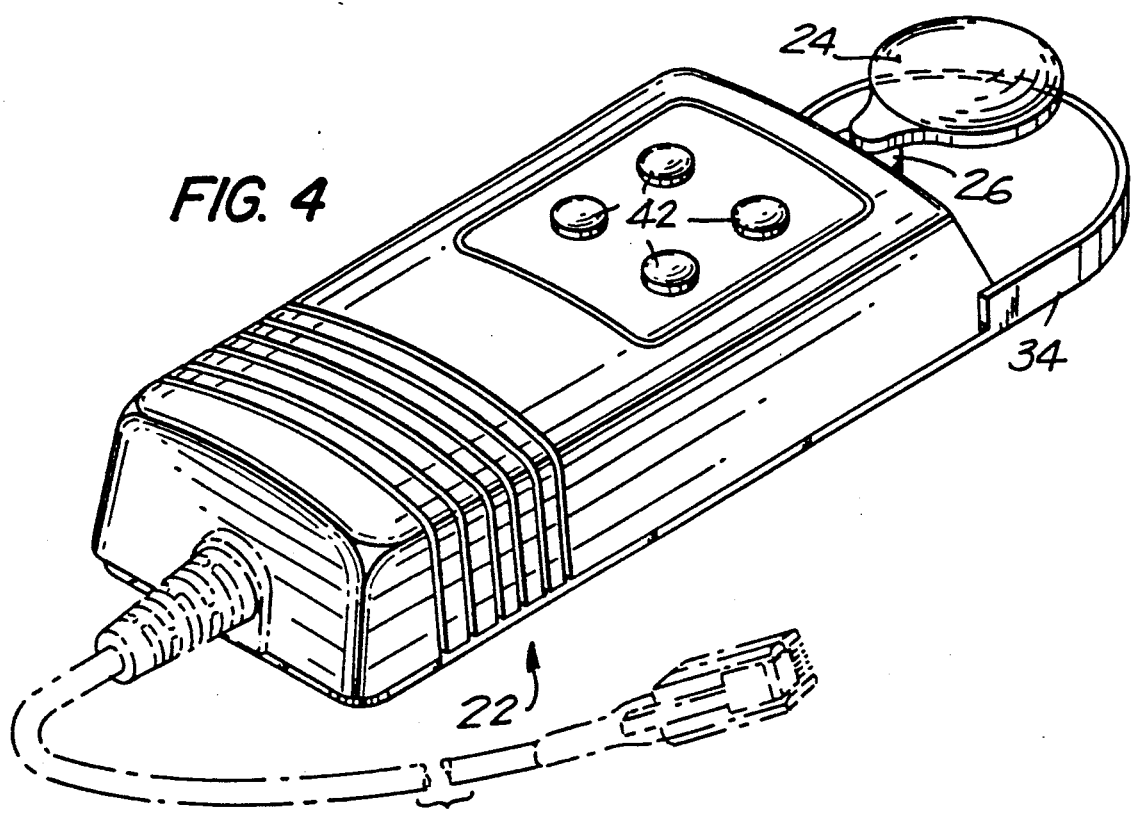
FIG. 4 is a perspective view, taken from the rear, of the magnifying assembly of FIGS. 2 and 3.

As illustrated in FIG. 1, an assembly 20 utilizable with a digitizer cursor 22 (FIGS. 2 and 3) for increasing the accuracy of position determinations comprises a magnifying lens 24 and a cradle or lens (second member). Integral with the magnifying lens 24 is a mounting pivot arm 28 (first member) which is insertable into a receiving receptacle or recess 30 provided in cradle 26.

Figure 2:
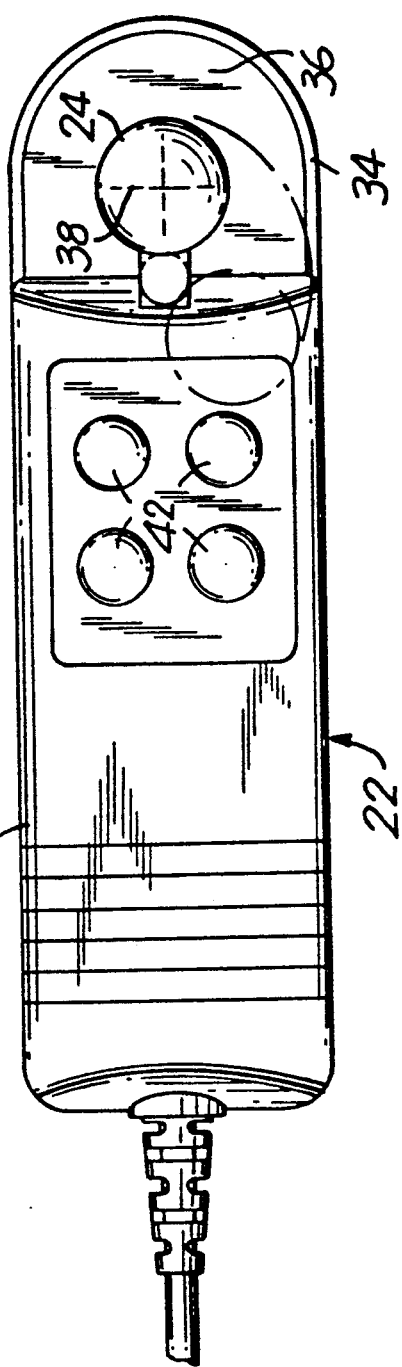
FIG. 2 is a top view of a cursor with the magnifying assembly of FIG. 1 mounted thereto in an operative configuration.
Figure 3:
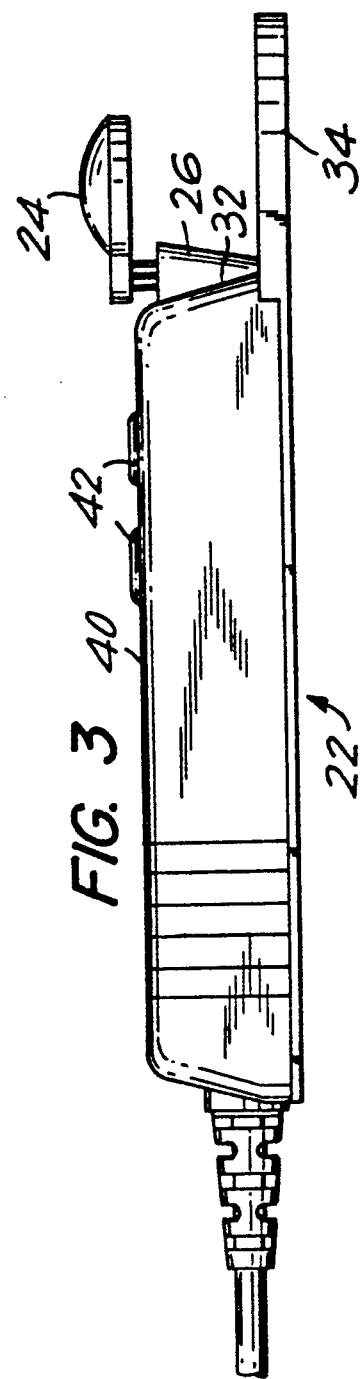
FIG. 3 is a side elevational view of the cursor and magnifying assembly of FIG. 2.

As depicted in FIGS. 2 and 3, cradle 26 is attachable, e.g., via an adhesive, to cursor 22 in a region thereof near cross-hairs 38 of cursor 22, e.g., to forward-facing surface 32 of the body or housing of cursor 22. The illustrated cursor 22 is part of a capacitive-type digitizer and is provided with a conductive ring (not shown) embedded in a plastic paddle 34 affixed to the underside of the body of the cursor 22, and extending forwardly therefrom with respect to the forward-facing surface 32 of the cursor. The paddle 34 has a shielding layer 36 on its upper surface, at the exposed end thereof. In an operative position of magnifying lens 24, shown in solid lines in FIG. 2, the lens is disposed in vertical alignment with cross-hairs 38 which may be molded or otherwise formed on the paddle centrally of the conductive ring. The magnifying lens enables an operator to position the cross-hairs in registration with a desired feature or position on a digitizing surface with an accuracy which is greater than possible with the unaided eye. As shown in broken lines in FIG. 2, magnifying lens 24 may be temporarily swung substantially parallel to cross-hairs 38 to a neutral or storage position on one side thereof to enable viewing of cross-hairs 38 with the unaided eye for the purpose of making coarse adjustments in the position of cursor 22.

Cursor 22 may be of a type utilizable with a capacitive digitizing tablet of the kind disclosed in U.S. Pat. No. 4,705,919 to Dhawan. It is of course apparent that the cursor may alternatively be of a type adapted for us with other types of digitizing tablets. As shown in FIGS. 1, 2 and 3, cursor 22 is provided on an upper surface 40 with a plurality of pushbuttons 42 whose functions are determined by programming and accordingly may be changed in accordance the particular application and in conformity with the desires of the operator.

Figure 5:
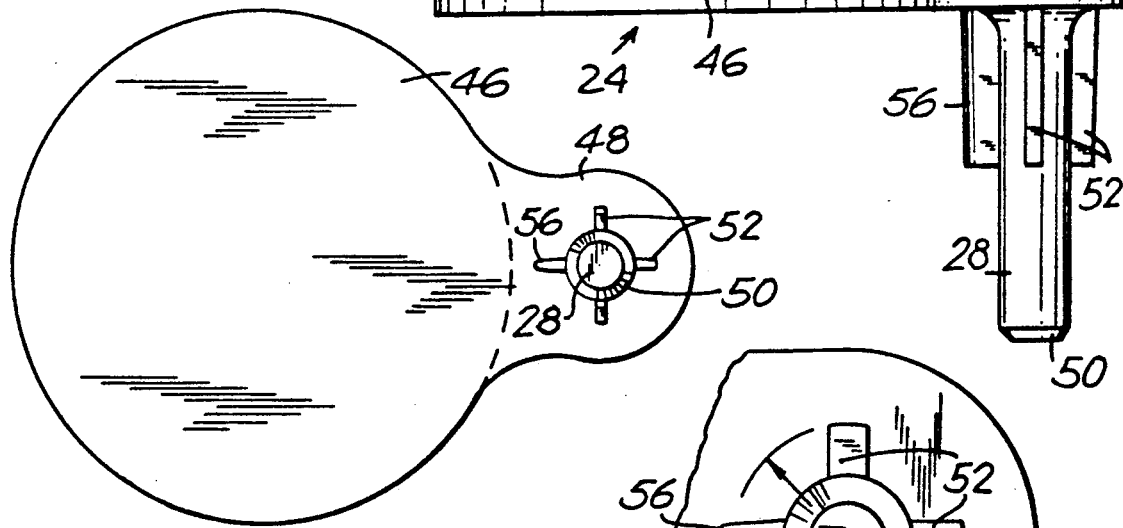
FIG. 5 is a side elevational view, on an enlarged scale, of the magnifying lens component illustrated in FIG. 1
Figure 6:
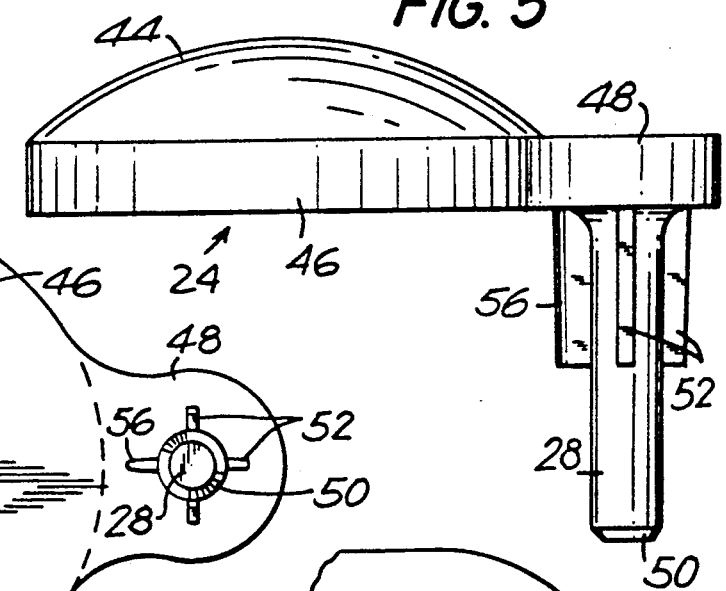
FIG. 6 is a bottom view, on an enlarged scale of the magnifying lens of FIGS. 1 and 5.

FIG. 5 shows magnifying lens 24 and mounting arm 28 as a unitary or integral molded component. Magnifying lens 24 takes the form of a solid bubble section or swelling 44 protruding from an upper side of a circular body portion 46. As illustrated in FIGS. 5 and 6, body portion 46 is provided with an extension 48 located in the plane of body portion 46. Cooperating structure on arm 28 for removably connecting lens 24 to cradle 26 comprises the following. Mounting arm 28 is a cylindrical projection extending perpendicularly with respect to the plane of body portion 46 and connected to extension 48 on a lower side thereof, i.e., on a side of body portion 46 opposite lens bubble section 44. At a free end, mounting arm 28 is provided with a beveled surface 50 for facilitating the insertion of the magnifying lens into recess 30 in cradle 26.

Figure 7:
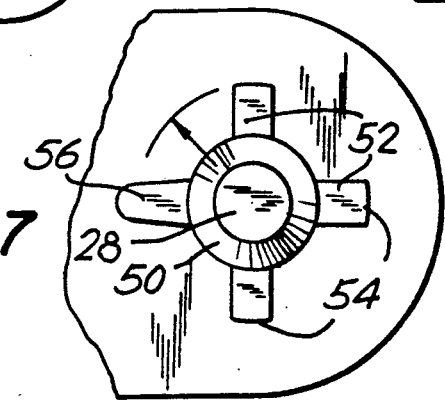
FIG. 7 is a partial bottom view, on a still larger scale, of a portion of the magnifying lens shown in FIG. 6.

As shown in FIGS. 5, 6 and 7, the cooperating structure associated with arm 28 also includes three circumferentially spaced longitudinally extending ribs 52 each having a cylindrical outer surface 54. Ribs 52 are shorter than mounting arm 28 and are connected at an upper end to extension 48. A fourth rib 56 integral with mounting arm 28 has the same length as ribs 52 but a greater radial dimension or width.

Figure 8:
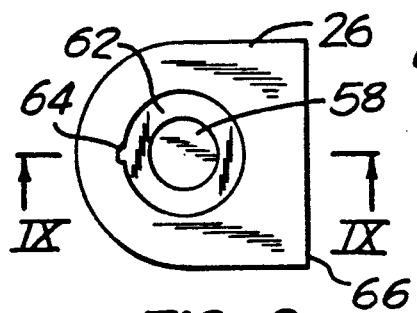
FIG. 8 is a top view of the cradle component of FIG. 1.
Figure 9:
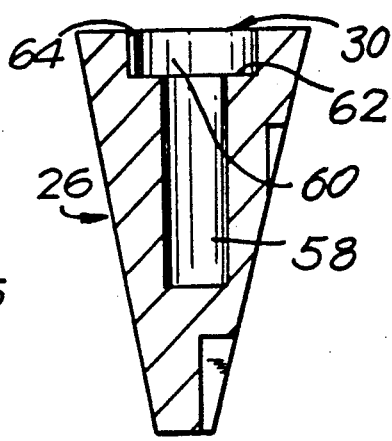
FIG. 9 is a cross-sectional view, taken along line IX—IX in FIG. 8.
Figure 10:
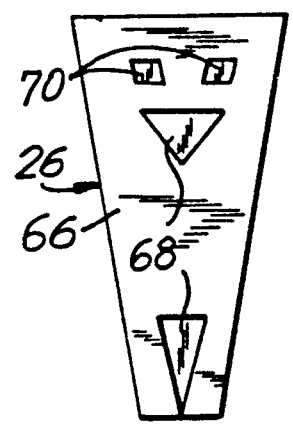
FIG. 10 is an elevational view of the cradle of FIGS. 1, 8 and 9, taken from the right-hand side in FIGS. 8 and 9.

FIGS. 8-10 illustrate cradle 26 in detail. Cooperating structure associated with cradle 26 for removably connecting arm 28 to cradle 26 includes in recess 30 a cylindrical lower or inner portion 58 and a cylindrical upper or outer portion 60. Outer recess portion 60 has a greater diameter than inner recess portion 58, thereby defining a shoulder 62. Ribs 52 and 56 engage shoulder 62 in an assembled configuration of the magnifying assembly 20, shown in FIGS. 2 and 3.

Outer portion 60 of cradle recess 30 is provided with a recess or notch 64 in which is seated the longitudinally extending free side of rib 56 in the operative position of the magnifying lens, shown in solid lines in FIGS. 2. Rib 56 accordingly acts as a detent to lock magnifying lens 24 in position over cross-hairs 38. Magnifying lens 24 may be rotated by exerting sufficient torque on the lens component to snap rib 56 out of notch 64. The lens component is then swung to the storage position shown in broken lines in FIG. 2. During the rotation of magnifying lens 24, cylindrical outer surfaces 54 of ribs 52 slide along the cylindrical surface of outer recess portion 60. To facilitate the sliding of ribs 52 against the recess wall and to ensure a medium friction fit of the mounting arm to the cradle, particularly in neutral positions of the lens component, the radius of curvature of outer rib surfaces 54 is essentially equal to the radius of curvature of the cylindrical wall of outer recess portion 60.

As shown in FIGS. 1 and 8, cradle 26 has a rearwardly facing planar surface 66 to which adhesive is applied for attaching the cradle to forward facing surface 32 of cursor 22. As depicted in FIGS. 9 and 10, planar surface 66 may be provided with a multiplicity of triangular and rhomboid recesses 68 and 70 for maintaining a rearwardly disposed wall of cradle 26 at a substantially uniform thickness and to thereby relieve undesired stresses which may arise during fabrication of the cradle.

Both cradle 26 and magnifying lens 24 are manufactured by injection molding. Typically the lens has a magnification power of three. However, in accordance with the present invention, one lens component 24 may be replaced by another component having a greater magnification power, if warranted by the circumstances.

Figure 11:
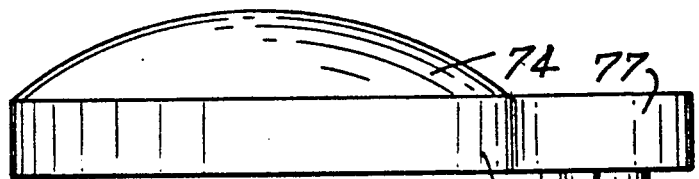
FIG. 11 is a side elevational view, on an enlarged scale, of another magnifying lens component in accordance with the present invention.

As shown in FIG. 11, a magnifying lens component 72 in accordance with another embodiment of the present invention includes a lens portion 74 integral with a disk-shaped body portion 76 in turn integral with an extension 77. Lens portion 72 is disposed on a side of body portion 74 opposite a cylindrical mounting arm 78 attached to extension 77 and projecting perpendicularly to the plane of body portion 74. A longitudinally oriented locating rib 80 is formed along mounting arm 78 and extends approximately halfway along the length thereof. The free end of mounting arm 78 is provided with an annular beveled surface 82.

Figure 13:
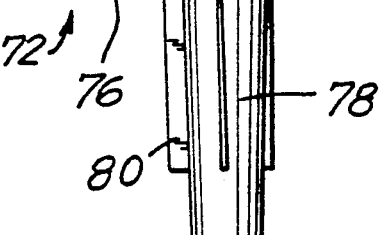
FIG. 13 is a perspective view of the magnifying lens of FIG. 12 in exploded relation to a corresponding cradle component.
Figure 12:
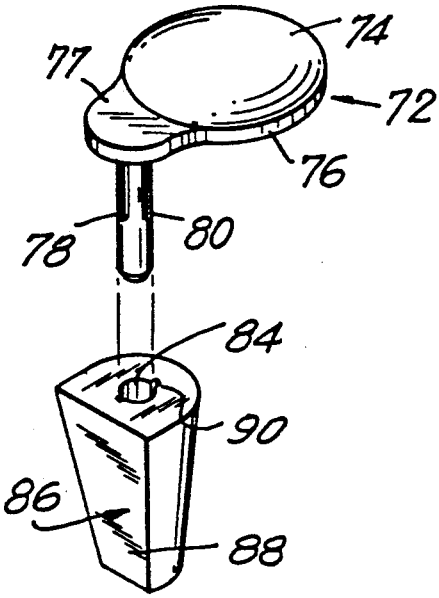
FIG. 12 is a partial bottom view, on an enlarged scale, of the magnifying lens shown in FIG. 12.

Mounting arm 78 is received in a cylindrical receptacle or recess 84 in a cradle or holder 86 attachable by adhesive along a planar face 88 to a cursor in a region about the cross-hairs of the cursor. Locating rib 80 acts as a detent seatable in any of four longitudinal grooves or notches 90 circumferentially equal-spaced about recess 84. The magnifying lens of the embodiment of FIGS. 11-13 thus has four orthogonally disposed rest positions in which the lens component is locked to the cradle.

Although the invention has been described in terms of particular embodiments and applications, one of ordinary skill in the art, in light of this teaching, can generate additional embodiments and modifications without departing from the spirit of or exceeding the scope of the claimed invention. For example, different structures for temporarily locking the lens component to the cradle component are clearly conceivable by one skilled in the art. Accordingly, it is to be understood that the drawings and descriptions herein are proferred by way of example to facilitate comprehension of the invention and should not be construed to limit the scope thereof.

What is claimed is:

1. An assembly utilizable with a digitizer cursor for increasing the accuracy of position determinations of said cursor, said cursor having cross-hairs for facilitating positioning of said cursor at a desired point on a digitizing surface, comprising in combination:
   a magnifying lens;
   mounting means including first means attachable to said cursor and second means connected to said lens for removably mounting said magnifying lens to said first means, said first means being attachable to said cursor to mount said lens to said cursor in alignment with said cross-hairs of said cursor;
   said first and second means cooperating such that said magnifying lens may be swung out of alignment with said cross-hairs of said cursor while said magnifying lens remains mounted to said first means.

2. The assembly defined in claim 1 wherein said first means includes a first member attachable to said cursor and said second means includes a second member, said mounting means further comprising cooperating structure of said first member and said second member for removably connecting said first and second members.

3. The assembly defined in claim 2 wherein said cooperating structure comprises a projection on one of said first member and said second member and a receptacle on the other of said first member and said second member receiving said projection.

4. The assembly defined in claim 3 wherein said cooperating structure connects said first member to said second member for pivoting of said second member relative to said first member, said assembly further comprising locking means on said first member and said second member for releasably locking said lens in a predetermined pivoted position with respect to said second member.

5. The assembly defined in claim 4 wherein said locking means includes a projection on one of said first member and said second member and a recess on the other of said first member and said second member.

6. The assembly defined in claim 2 wherein said second member and said lens comprise a unitary component of said assembly.

7. An assembly utilizable with a digitizer cursor for increasing the accuracy of position determinations of said cursor, said cursor having cross-hairs for facilitating positioning of said cursor at a desired point on a digitizing surface, comprising in combination:
   a magnifying lens;
   a mounting arm connected to and extending from said lens; and
   a mounting cradle attachable to an outer housing surface of said cursor in a region near said cross-hairs;
   said mounting arm and said cradle including cooperating structure for removably connecting said arm to said cradle and for pivotally connecting said arm to said cradle; said cradle being attachable to said cursor to removably mount said lens to said cursor in alignment with said cross-hairs.

8. The assembly defined in claim 7 wherein said mounting arm is integral with said lens.

9. The assembly defined in claim 8 wherein said lens has a polished surface.

10. The assembly defined in claim 7, further comprising locking means on said mounting arm and said cradle for releasably locking said mounting arm in a predetermined pivoted position with respect to said cradle.

11. The assembly defined in claim 10 wherein said locking means includes a projection on one of said mounting arm and said cradle and a recess on the other of said mounting arm and said cradle.

12. The assembly defined in claim 11 wherein said projection takes the form of a longitudinally extending rib on said mounting arm.

13. The assembly defined in claim 7 wherein said lens defines a plane and said arm extends perpendicularly with respect to said plane.

14. The assembly defined in claim 7 wherein said cooperating structure comprises a plurality of circumferentially spaced longitudinally-extending ribs on said mounting arm and a cylindrical receptacle on said cradle for receiving said arm with said ribs engaging said receptacle.

15. An assembly utilizable with a digitizer cursor for increasing the accuracy of position determinations of said cursor, said cursor having cross-hairs for facilitating positioning of said cursor at a desired point on a digitizing surface, comprising in combination:
   a magnifying lens; and
   means for pivotally mounting said magnifying lens to said cursor such that said magnifying lens may be swung relative to said cursor substantially parallel to said cross-hairs between an operative position in alignment with said cross-hairs and a storage position to one side of said cross-hairs.

16. A digitizer cursor comprising:
   cross-hairs for facilitating positioning of said cursor at a desired point on a digitizing surface;
   a magnifying lens; and mounting means including first means attached to said cursor and second means connected to said magnifying lens for removably mounting said magnifying lens to said first means, said first means being attached to said cursor to mount said lens in alignment with said cross-hairs;

said first and second means cooperating such that said magnifying lens may be swung out of alignment with said cross-hairs of said cursor while said magnifying lens remains mounted to said first means.

17. The cursor defined in claim 16 wherein said first means includes a first member attached to said cursor and said second means includes a second member connected to said magnifying lens, said mounting means further comprising cooperating structure on said first member and said second member for removably connecting said second member to said first member.

18. The cursor defined in claim 17 wherein said cooperating structure comprises a projection on one of said first member and said second member and a receptacle on the other of said first member and said second member receiving said projection.

19. The cursor defined in claim 18 wherein said cooperating structure connects said first member to said second member for pivoting of said second member relative to said first member, said assembly further comprising locking means on said first member and said second member for releasably locking said lens in a predetermined pivoted position with respect to said second member and said cursor.

20. A digitizer cursor comprising:

cross-hairs for facilitating positioning of said cursor at a desired point on a digitizing surface;

a magnifying lens;

a mounting arm connected to and extending from said lens; and a mounting cradle attached to an outer housing surface of said cursor in a region near said cross-hairs;

said mounting arm and said cradle including cooperating structure for removably connecting said arm to said cradle and for pivotally connecting said arm to said cradle;

said cradle being attached to said cursor to removably mount said lens to said cursor in alignment with said cross-hairs.

21. The cursor defined in claim 20 wherein said cooperating structure comprises a projection on one of said arm and said cradle and a receptacle on the other of said arm and said cradle receiving said projection.

22. The cursor defined in claim 2, further comprising locking means on said arm and said receptacle for releasably locking said lens in a predetermined pivoted position with respect to said cradle and said cursor.

23. A digitizer cursor comprising:

cross-hairs for facilitating positioning of said cursor at a desired point on a digitizing surface;

a magnifying lens; and mounting means for mounting said magnifying lens to said cursor such that said magnifying lens may be swung relative to said cursor substantially parallel to said cross-hairs between an operative position in alignment with said cross-hairs and a storage position to one side of said cross-hairs.

* * * * *